United States Patent [19]
Herzog

[11] Patent Number: 5,587,076
[45] Date of Patent: Dec. 24, 1996

[54] FILTER NOZZLE FOR INJECTION MOLDING MACHINES PROCESSING THERMOPLASTICS

[75] Inventor: Kurt Herzog, Wattwil, Switzerland

[73] Assignee: Herzog AG, Wolfertswil, Switzerland

[21] Appl. No.: 446,011

[22] Filed: May 19, 1995

[30] Foreign Application Priority Data

May 25, 1994 [CH] Switzerland ............................ 1613/94

[51] Int. Cl.[6] ..................................................... B01D 35/02
[52] U.S. Cl. .................... 210/461; 210/497.01; 425/197; 239/533.7; 239/590.5
[58] Field of Search ............................. 239/533.7, 590.5, 239/601; 210/460, 461, 497.01; 425/197, 199, 564

[56] References Cited

U.S. PATENT DOCUMENTS

| | | | |
|---|---|---|---|
| 1,500,986 | 7/1924 | Fish | 239/590.5 |
| 2,376,292 | 5/1945 | Tabb et al. | 239/533.7 |
| 3,486,700 | 12/1969 | Bristow | 239/590.5 |
| 4,346,849 | 8/1982 | Rood | 239/601 |
| 4,434,053 | 2/1984 | Osuna-Diaz | 210/446 |
| 4,627,574 | 12/1986 | Hofmann | 239/590.5 |
| 4,906,360 | 3/1990 | Trakas | 210/447 |
| 4,952,132 | 8/1990 | Lundquist | 425/197 |
| 5,273,216 | 12/1993 | Goulet et al. | 239/590.5 |

FOREIGN PATENT DOCUMENTS

| | | |
|---|---|---|
| 386802 | 3/1988 | Austria . |
| 0399086 | 11/1990 | European Pat. Off. . |
| 0163614 | 12/1995 | European Pat. Off. . |
| 2340134 | 3/1974 | Germany . |
| 3840904 | 10/1989 | Germany . |
| 3935667 | 5/1991 | Germany . |
| 211312 | 7/1994 | Germany . |

*Primary Examiner*—W. L. Walker
*Attorney, Agent, or Firm*—McGlew and Tuttle

[57] ABSTRACT

A filter is inserted into a cylindrical hole of a nozzle body 1. The filter has an axial blind hole, which communicates with transverse or radial holes. The transverse holes open into peripheral longitudinal trap channels, which are axially open against a collection space. Via slot-like openings, the trap channels are connected to second or clean channels, which communicate with an outlet opening of the nozzle body. A flushing opening, which can be closed by a screw, leads from the collection space to the outside. When foreign bodies have accumulated in the trap channels, the flushing opening is opened, and the foreign bodies are flushed out with an injection stroke. As a result, the foreign bodies can be removed rapidly and in a simple manner.

13 Claims, 1 Drawing Sheet

FILTER NOZZLE FOR INJECTION MOLDING MACHINES PROCESSING THERMOPLASTICS

FIELD OF THE INVENTION

The present invention pertains to a filter nozzle for thermoplastic injection molding machines, where a filter is positioned inside the nozzle. More particularly, the present invention pertains to a filter nozzle where contaminants or foreign bodies which are trapped by the filter can be removed from the nozzle without removing the filter.

BACKGROUND OF THE INVENTION

Melt filters, which are used for processing thermoplastics, have the task of filtering out foreign bodies. The foreign bodies are retained in the filter and must be sporadically removed. If the foreign bodies were not removed, the filter would eventually clog and no thermoplastic would be able to flow through the filter. Removal of the foreign bodies from the filter is usually done by removal of the filter from the body. The contaminants are then manually removed by either scraping of the filter, or washing of the filter in a solvent.

Such removal of the contaminants, is time consuming both in the removal of the filter from the body, and removing the contaminants from the filter.

SUMMARY AND OBJECTS OF THE INVENTION

The basic task of the present invention is to design a filter nozzle such that foreign bodies can be removed in the simplest and most rapid manner possible. This task is accomplished by providing a nozzle body with an inlet opening and an outlet opening. The inlet and outlet openings are connected by a passage and the filter is positioned inside this passage. The nozzle body also defines a flushing opening, which is in communication with the passage and leads to an exterior of the nozzle for discharging contaminants.

The filter is designed to direct the thermoplastic along a trap channel. Adjacent the trap channel is a clean channel, and filter passages or slot-like openings extend between the trap channel and the clean channel. These openings or passages are of a size so as to block contaminants from flowing from the trap channel to the clean channel. These openings or passages are also positioned substantially perpendicularly to the channels. At a downstream side of the trap channels, the trap channels open into a collection space. The flushing opening communicates with the collection space. When the flushing opening is opened, thermoplastic will flow along the trap channel, into the collection space, and out the flushing opening. This movement of the thermoplastic in the trap channel, carries contaminants away from the filter passages. The contaminants then flow into the collection space and out the flushing opening. In this way, the filter can be cleaned by opening the flushing opening, and flowing thermoplastic, or any other fluid through the nozzle.

In particular, the filter is designed with a projection that comes into sealing contact with the portion of the nozzle body that defines the inlet opening. The filter and the projection part define an axial hole which has an end that is completely and solely in communication with the inlet opening. Another end of the axial hole is blocked so as not to be in communication with the outlet opening. At an opposite end of the axial hole from the inlet opening, the filter defines radial holes being in communication with the axial hole and extending outwards. The filter also defines alternating trap and clean channels on its outer circumference. The trap channels have one end adjacent the radial holes and are in communication with the radial holes at this end. This end of the trap channels is closed to the outlet opening. The other end of the trap channels opens into the collection space which is defined by the projection and the nozzle body. The flushing hole also opens into this collection space. The clean channels are positioned alternately adjacent to the trap channels with their axes substantially parallel. One end of the clean channels is adjacent to the outlet opening, and is in communication with the outlet opening. The other end of the clean channels, which is adjacent the collection space, is closed to the collection space. This provides a very compact filter, which can be positioned in a nozzle, provides a substantial amount of filter surface area and yet provides the ability to clean the filter by opening a flushing opening.

It is also an object of the present invention to provide a filter nozzle for thermoplastic injection molding machines which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings.

An exemplary embodiment of the present invention will be explained below on the basis of the drawings. In the drawings.

DETAILED DESCRIPTION OF THE PREFERRED EMBODIMENT

Figure 1:
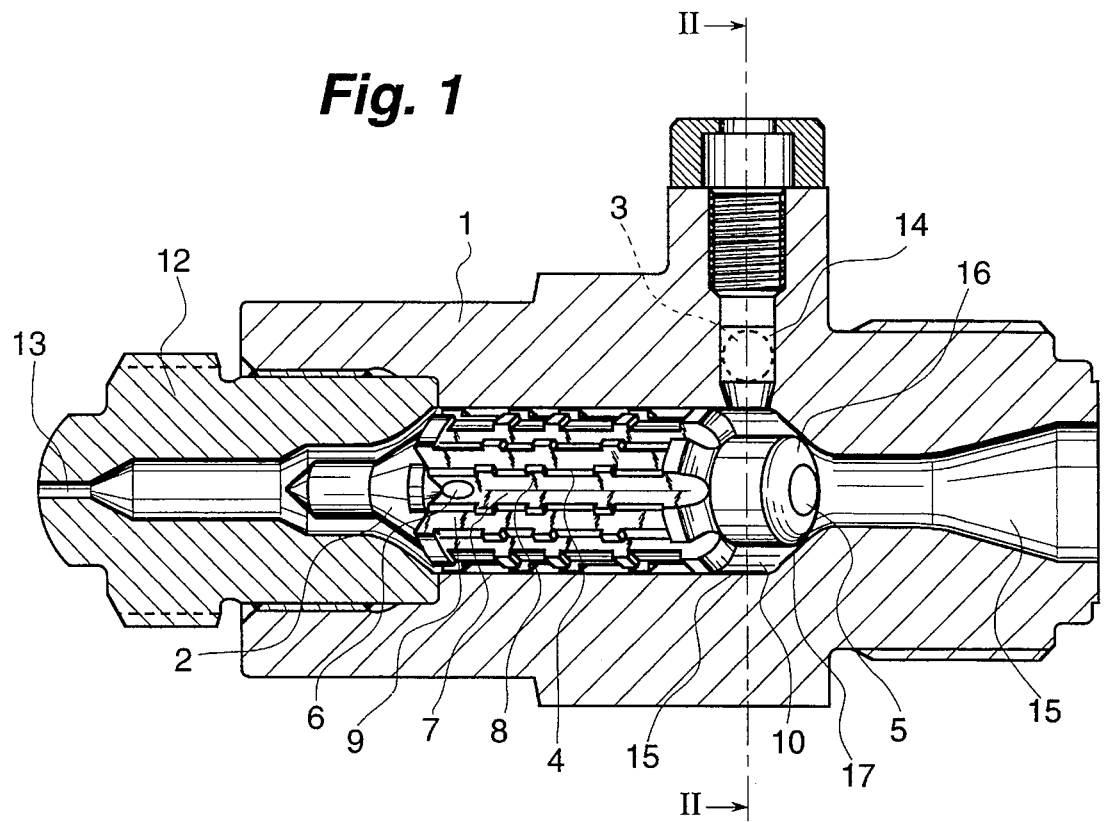
FIG. 1 shows a perspective view of a longitudinal section through the nozzle with the filter.
Figure 2:
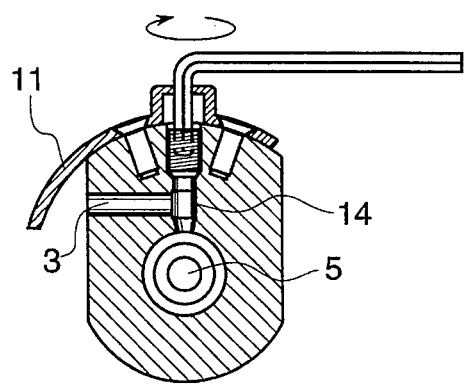
FIG. 2 shows a sectional view transversely through the nozzle along line II—II in FIG. 1 with the flushing opening closed.
Figure 3:
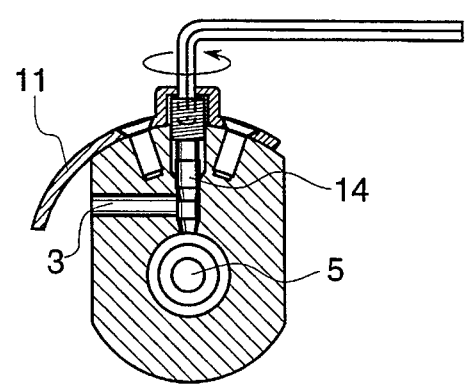
FIG. 3 shows a section corresponding to FIG. 2 with the flushing opening open.

A filter 2 is pushed into a cylindrical hole 15 of a nozzle body 1, and the hole 15 is closed by a nozzle head 12, which has an outlet opening 13. A cylindrical projection 16 of the filter 2 is in sealing contact with a step 17 of the nozzle body 1. A collection space 10 extends between the projection 16 and the hole 15. A flushing opening 3 leads from the collection space 10 to the outside, and this opening can be closed with a set screw 14. Thermoplastic material flows through the inlet opening 15 and into an axial, noncontinuous hole 5. The thermoplastic material continues through radial connection holes 6 into peripheral trap channels 7. The peripheral channels 7 having substantially parallel axes. The plastic then flows through slot-like openings or filter passages 4 and into clean channels 9, which lead to the outlet opening 13. The channels 7, 9 are separated from one another by partitions 8. Ends of the channels 7 are closed against the outlet opening 13, and the ends of channels 9 are closed against the collection space 10 on the front side.

Foreign bodies entrained by the plastic and which cannot melt, are retained in the channels 7. To remove these bodies, the screw 14 is screwed out up to the stop on the splash guard 11. The foreign bodies are delivered with a subsequent injection stroke from the channels 7 into the collection space 10 and to the outside through the flushing opening 3. The splash guard is used as a protective means against the plastic being discharged.

While specific embodiments of the invention have been shown and described in detail to illustrate the application of the principles of the invention, it will be understood that the invention may be embodied otherwise without departing from such principles.

What is claimed is:

1. A filter nozzle for thermoplastic injection molding machines, the nozzle comprising:

a nozzle body defining an inlet opening, an outlet opening and a passage between said inlet opening and said outlet opening, said nozzle body also defining a flushing opening communicating with said passage;

a filter positioned in said passage in an area adjacent said flushing opening, said filter including partition means for blocking contaminants from flowing through said filter, said filter and said nozzle body providing a path from an upstream side of said partition means to said flushing opening, said path not passing through said partition means;

means for opening and closing said flushing opening to remove contaminants from upstream of said filter.

2. A nozzle in accordance with claim 1, wherein:

said filter defines an axial hole, said filter defines a radial hole with a first end in communication with said axial hole, said filter also defines a trap channel, a second opening of said radial hole being in communication with an upstream end of said trap channel, a downstream end of said trap channel being in communication with a collection space, said collection space being in communication with said flushing opening.

3. A nozzle in accordance with claim 2, wherein:

said filter includes a plurality of said partition means to define a plurality of said trap channels and to define a plurality of clean channels, said clean channels having ends in communication with said outlet opening, said clean channels being alternately positioned between said trap channels, said partition means also defining slot-like openings.

4. A nozzle in accordance with claim 3, wherein:

another end of said trap channels is closed to said outlet opening, another end of said clean channels is closed to said collection space.

5. A nozzle in accordance with claim 1, wherein:

said area of said passage adjacent said filter is a cylindrical hole in said nozzle body.

6. A nozzle in accordance with claim 1, further comprising a splash guard connected to said nozzle body and covering said flushing opening.

7. A nozzle in accordance with claim 1, wherein:

said filter defines an axial hole, said axial hole having a first end in substantially complete and sole communication with said inlet opening, a second end of said axial hole being closed to said outlet opening, said filter defining a radial hole with a first end in communication with said axial hole, said filter defining a trap channel, a second opening of said radial hole being in communication with an upstream end of said trap channel, a downstream end of said trap channel being in communication with said flushing opening, said filter defining a clean channel with an end in communication with said outlet opening, said partition means defining filter passages between said trap channel and said clean channel for blocking the contaminants.

8. A nozzle in accordance with claim 7, wherein:

said filter includes a projection in sealing contact with said body defining said inlet opening, said filter and said body define a collection space in said passage, said downstream end of said trap channel and said flushing opening being in communication with said collection space.

9. A nozzle in accordance with claim 7, wherein:

said trap channel and said clean channel are positioned substantially parallel to and adjacent each other, said filter passages being substantially perpendicular to said trap and clean channels.

10. A nozzle in accordance with claim 7, wherein:

said filter defines a plurality of said trap and clean channels alternately on an outer surface of said filter.

11. A nozzle in accordance with claim 1, wherein:

said path has a portion adjacent said partition means, said portion of said path flowing substantially perpendicular to a direction of flow through said partition means.

12. A filter nozzle for thermoplastic injection molding machines, the comprising:

a nozzle body defining an inlet opening, an outlet opening and a passage between said inlet opening and said outlet opening, said nozzle body also defining a flushing opening communicating with said passage;

a filter positioned in said passage in an area adjacent said flushing opening, said filter defining an axial hole, said filter also defining a radial hole with a first end in communication with said axial hole, said filter also defining a trap channel, a second opening of said radial hole being in communication with an upstream end of said trap channel, a downstream end of said trap channel being in communication with a collection space, said collection space being in communication with said flushing opening, said filter including a plurality of partitions to define a plurality of said trap channels and to define a plurality of clean channels, said clean channels having ends in communication with said outlet opening, said clean channels being alternately positioned between said trap channels, said partitions also defining slot-like openings;

means for opening and closing said flushing opening to remove contaminants from upstream of said partitions.

13. A filter nozzle for thermoplastic injection molding machines, the nozzle comprising:

a nozzle body defining an inlet opening, an outlet opening and a passage between said inlet opening and said outlet opening, said nozzle body also defining a flushing opening communicating with said passage;

a filter positioned in said passage in an area adjacent said flushing opening, said filter defining an axial hole, said axial hole having a first end in substantially complete and sole communication with said inlet opening, a second end of said axial hole being closed to said outlet opening, said filter defining a radial hole with a first end in communication with said axial hole, said filter defining a trap channel, a second opening of said radial hole being in communication with an upstream end of said trap channel, a downstream end of said trap channel being in communication with said flushing opening, said filter defining a clean channel with an end in communication with said outlet opening, said filter also defining filter passages between said trap channel and said clean channel for blocking the contaminants;

means for opening and closing said flushing opening to remove contaminants from upstream of said filter passages.

* * * * *